United States Patent [19]

Tabuchi et al.

[11] Patent Number: 4,498,444

[45] Date of Patent: Feb. 12, 1985

[54] METHOD OF CONTROLLING ENGINE

[75] Inventors: Kenji Tabuchi, Katsuta; Masami Shida, Mito; Toshio Ishii, Katsuta, all of Japan

[73] Assignee: Hitachi, Ltd., Tokyo, Japan

[21] Appl. No.: 574,580

[22] Filed: Jan. 27, 1984

[30] Foreign Application Priority Data

Jan. 28, 1983 [JP] Japan .................... 58-11445

[51] Int. Cl.$^3$ ............................ F02M 51/00
[52] U.S. Cl. .................... 123/478; 123/480; 123/491; 123/179 L
[58] Field of Search .......... 123/478, 480, 491, 179 L, 123/179 B

[56] References Cited

U.S. PATENT DOCUMENTS

| | | | |
|---|---|---|---|
| 4,364,349 | 12/1982 | Miyagi et al. .................. | 123/491 |
| 4,383,515 | 5/1983 | Higashiyama et al. ........... | 123/480 |
| 4,388,906 | 6/1983 | Sugiyama et al. ............... | 123/480 |
| 4,434,770 | 3/1984 | Nishimura et al. ............. | 123/478 |
| 4,438,748 | 3/1984 | Ikeura et al. .................. | 123/491 |

FOREIGN PATENT DOCUMENTS 0092330  7/1981  Japan ................... 123/480

*Primary Examiner*—Parshotam S. Lall
*Attorney, Agent, or Firm*—Antonelli, Terry & Wands

[57] ABSTRACT

In a method of controlling a 4-stroke cycle internal combustion engine for automobile, when only a positional signal, which is generated each time the crank shaft of engine is rotated once, is first generated after the start of engine, only the fuel injection control is immediately made. When both the positional signal and a reference cylinder signal which is generated each time the crank shaft is rotated twice are generated after the start of engine, the fuel injection control and ignition control are made.

4 Claims, 7 Drawing Figures

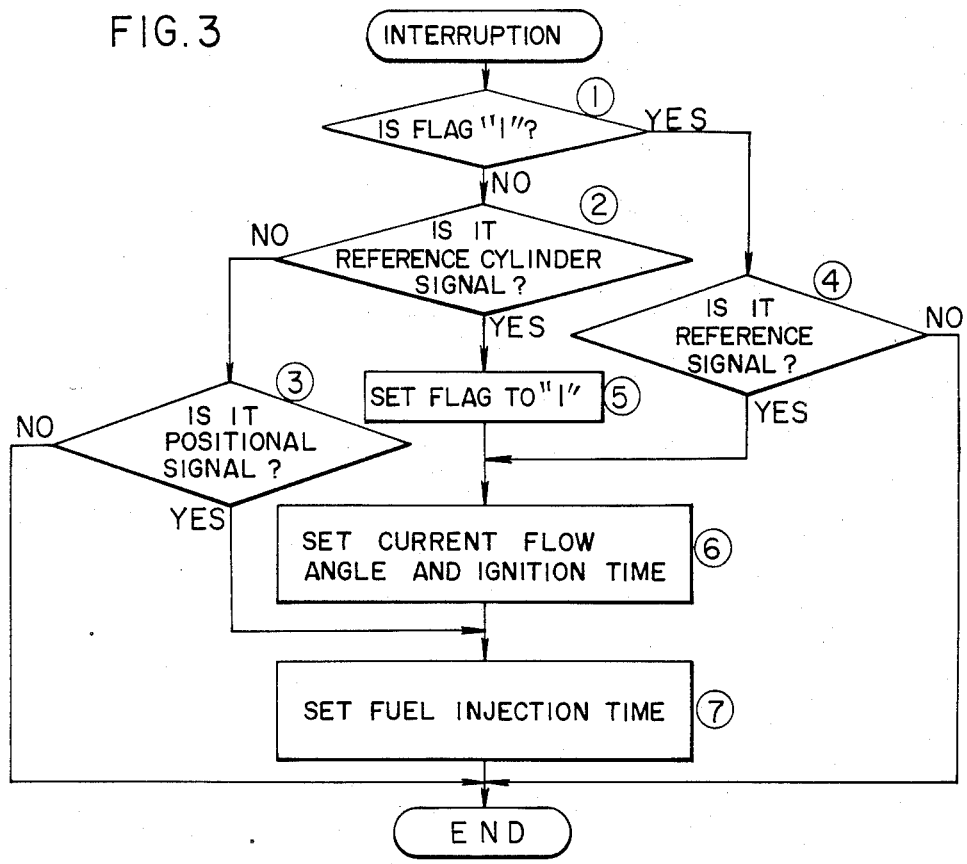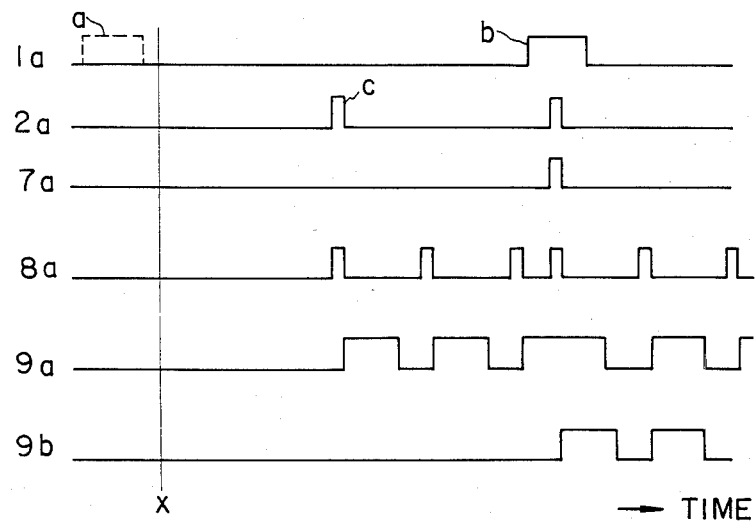

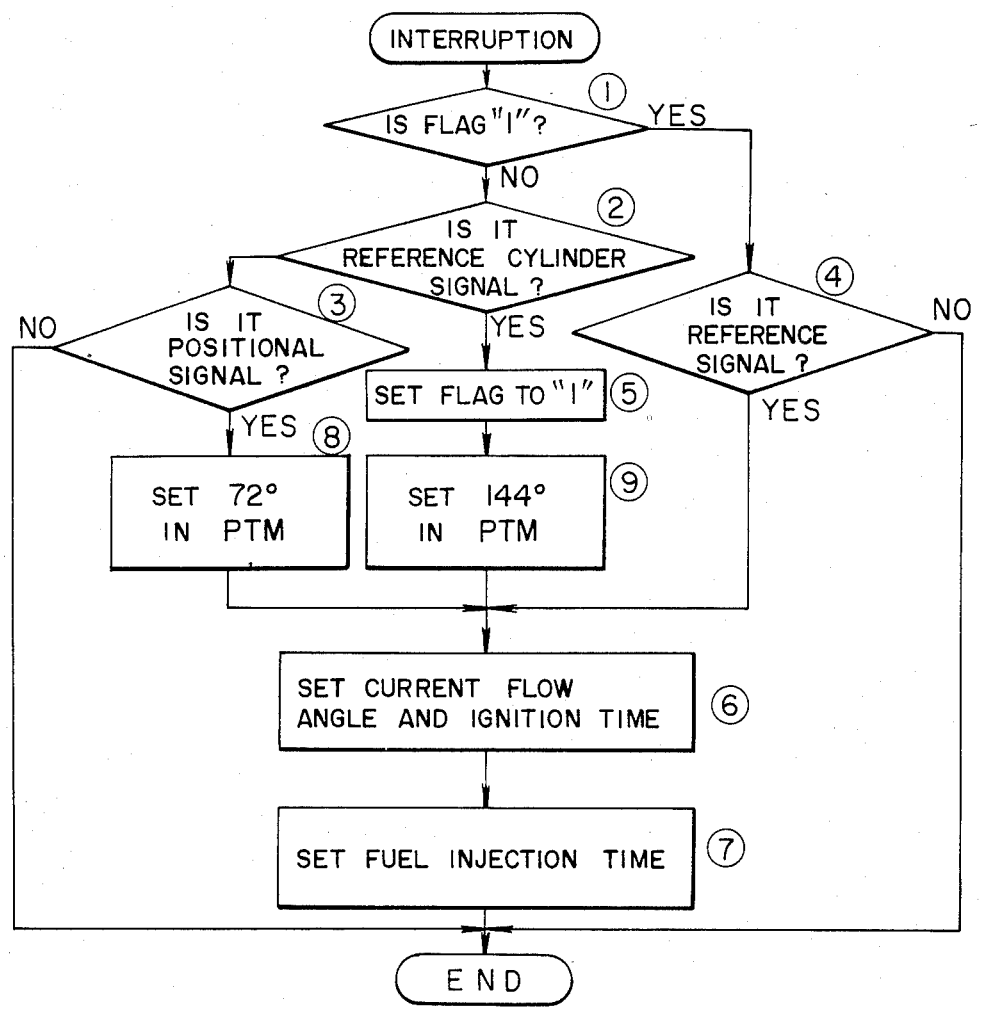

METHOD OF CONTROLLING ENGINE

This invention relates to a method of electronically controlling a four-stroke cycle interval combustion engine for automobile, and particularly to a method of controlling engine so as to have good starting characteristic.

Recently, an electronic control apparatus using a digital computer (hereinafter, referred to as microcomputer) is widely used to control the automobile engine to ignite and inject fuel.

In order for this control apparatus to control the amount of fuel to be supplied to engine, the ignition time and so on, it is necessary to generate a reference signal for each cylinder in synchronism with the rotation of engine. Two kinds of signal are used for generation of the reference signal: a reference cylinder signal generated each time the engine rotates twice and a positional signal generated each time the engine rotates once. When the reference cylinder signal is not generated, there is a problem that a cylinder to be ignited can not be determined. Also, if the engine has odd-numbered cylinders, it is not possible to decide whether the position signal indicates the time the reference signal is generated. Therefore, at the start of engine, the fuel and ignition were controlled on the basis of the generation of the reference cylinder signal. However, the reference cylinder signal is generated each time the engine is rotated twice and thus the interval between the pulses of the reference cylinder signal is long. Thus, when the engine stops just after the reference cylinder signal is generated, at the next start of engine the generation of reference cylinder signal becomes late, so that the control of fuel and ignition is delayed to thereby make the starting characteristic poor.

It is an object of the invention to provide a method of controlling engine with the defects of the prior art being obviated, and with the starting characteristic being improved enough by decreasing the time from the start of engine to the complete explosion of engine.

According to one aspect of this invention, there is provided a method of controlling engine capable of initiating the control at the start of engine even by only the positional signal and in which when only the positional signal is generated first after the start of engine, only the fuel injection control is immediately made. According to another aspect of this invention, there is provided a method of controlling engine capable of initiating the control at the start of engine even by only the positional signal and in which when the first signal appearing after the start of engine is only the positional signal or both the positional signal and reference cylinder signal, the timing at which the reference is generated on the basis thereof is made different for the respective cases.

The invention will become more readily understood from the following exemplary description taken with the accompanying drawings, wherein:

FIG. 3 is a flow chart of the operation thereof;

FIG. 4 is a timing chart;

FIG. 5 is a flow chart of the operation of another embodiment of the invention.

Embodiments of an engine control apparatus of the invention will be described with reference to the accompanying drawings.

Figure 1:
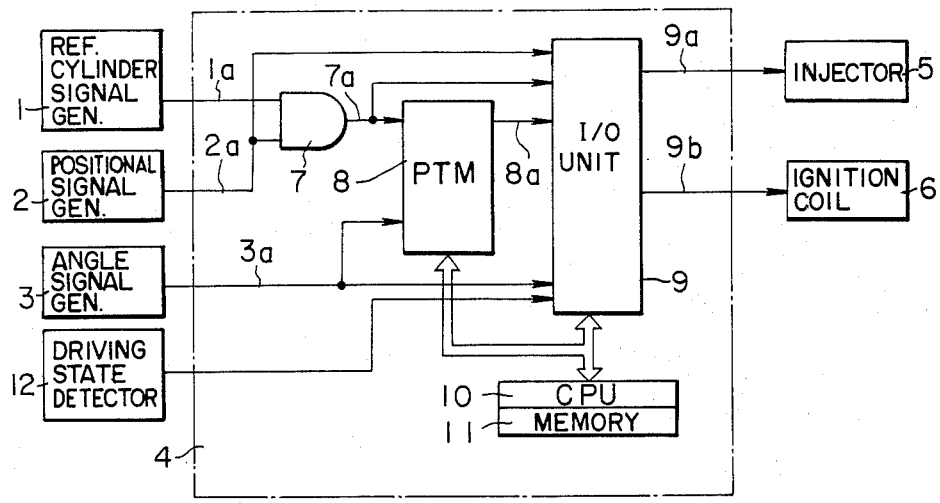
FIG. 1 is a block diagram of one embodiment of the engine control apparatus according to this invention.
Figure 2:
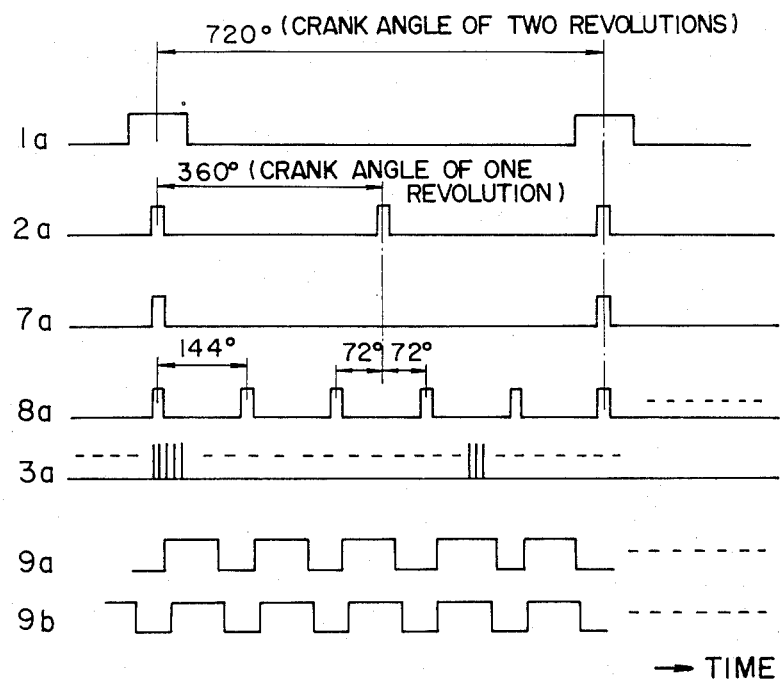
FIG. 2 is a timing chart of the operation thereof.

FIG. 1 shows one embodiment of this invention, and FIG. 2 is a timing chart for the timing of reference signals in FIG. 1. Referring to FIG. 1, there are shown a reference cylinder signal generator 1, a positional signal generator 2, an angle signal generator 3, a control unit 4, a fuel injection system 5, an ignition coil 6, an AND gate 7, a programable timer module (PTM) circuit 8, an input/output unit 9, a central processing unit (CPU) 10 constituting a microcomputer, a memory 11 for the microcomputer, and a driving state detector 12.

The reference cylinder signal generator 1 includes a rotation detecting sensor provided near the shaft rotating at ½ the rotational speed of the crank shaft of engine, such as the cam shaft or distributor shaft of engine. This sensor generates a single pulse of a reference cylinder signal 1a at a particular angular position each time the crank shaft rotates twice. Therefore, from the reference cylinder signal 1a it can be known that a reference cylinder is in a certain one of the four strokes.

The position signal generator 2 includes a rotation sensor provided near the crank shaft of engine or a member such as a flywheel rotating therewith. This sensor generates a single pulse of a positional signal 2a at a certain crank angle each time the crank shaft rotates once. Therefore, from the positional signal 2a it can be known that the piston of the reference cylinder is in a certain crank angle position.

The angle signal generator 3 includes a rotation sensor provided near the periphery of the ring gear for starting engine. This sensor generates a single pulse each time the crank shaft rotates by a certain angle, for example, 1 to 2 degrees and thus generates a plurality of pulses, for example, 180 to 360 pulses of an angle signal 3a each time the crank shaft rotates once. Therefore, from the angle signal 3a it can be known that the crank shaft is in a certain angle position.

The fuel injection system 5 and the ignition coil 6 are well known.

The AND gate 7 receives the reference cylinder signal 1a and the positional signal 2a and produces the logical product of the inputs, or a reference cylinder process signal 7a. Therefore, from this reference cylinder process signal 7a it can be known that the reference cylinder piston is in a certain stroke of the four-stroke cycle and in a certain crank angle position. To do this, it is necessary that every other pulses of the positional signal 2a be generated at the same crank angle positions as each pulse of the reference cylinder signal 1a.

The PTM circuit 8 is a counter for counting the angle signal 3a. This counter starts counting in response to the reference cylinder signal 7a and produces a reference signal 8a necessary for controlling each cylinder of engine each time the count reaches, for example, 144.

The input/output unit 9, CPU 10, and memory 11 constitute a microcomputer, which receives the reference signal 8a from the PTM circuit 8, the angle signal 3a from the angle signal generator 3 and various different information signals indicative of the driven state of engine such as the amount of sucked air to the engine or negative pressure of manifold, and produces a fuel injection signal 9a and an ignition signal 9b by computation on the basis thereof thereby to control the engine to inject fuel and ignite.

The operation of the embodiment of FIG. 1 will be described with reference to FIG. 2 (this invention is used for a 5-cylinder engine). In this engine control apparatus using such a microcomputer, the reference cylinder process signal 7a is produced on the basis of the reference cylinder signal 1a and positional signal 2a and the reference signal 8a necessary for fuel injection control and ignition control for each cylinder is produced by counting the angle signal 3a on the basis of the signal 7a, as is apparent from FIG. 2. The CPU 10 of the microcomputer receives the positional signal 2a and reference cylinder process signal 7a through the input-/output unit 9 and executes a program for processing three signals 2a, 7a and 8a as shown in FIG. 3.

The program of FIG. 3 will be described.

When the engine rotates, signals 1a, 2a and 3a are generated in accordance with certain conditions and the signals 7a and 8a are produced on the basis of the former signals. When one or more of the three signals of positional signal 2a, reference cylinder process signal 7a and reference signal 8a are generated, the CPU 10 starts to execute the program of FIG. 3. At step ① (hereinafter the word "step" is omitted), checking is made of whether the flag is set or not. The flag to be checked is set at a state in advance for the execution of program, and the reset condition thereof includes engine stopping. When this flag is in the reset condition, or at "0", the engine starts and the reference cylinder signal 7a is not generated yet. The flag is reset before the engine starts to rotation, or at the initialization when the microcomputer has been supplied with power.

If the decision at ① is NO, or if the flag is not yet "1", the program goes to ②, where decision is made of whether the signal for interruption is the reference cylinder process signal 7a of the three signals or not.

If the decision at ② is NO, or if the signal is not the reference cylinder process signal 7a, the program goes to 3 where decision is made of whether the signal at that time is the positional signal 2a or not.

If the decision at ③ is NO, or if the signal is not the positional signal 2a, the program goes to END, no process being executed.

If the decision at ① is YES, or if the flag is already raised, the program goes to 4, where decision is made of whether the signal at that time is the reference signal 8a or not. If the decision is NO, the program goes to END, no process being executed.

If the decision at ② is YES, or if the signal at that time is the reference cylinder process signal 7a, the program goes from ② to ⑤, where the flag is set to "1". Then, at 6 a necessary process is executed for ignition control so that a signal for generation of the ignition signal 9b is set in the input/output circuit 9. The input/output circuit 9 generates the ignition signal 9b at the angle indicated by the signal set on the basis of the signals 8a and 3a, allowing the ignition operation to be performed. The program further goes to ⑦, where a process necessary for the fuel injection control is executed so that a signal for generation of the fuel injection signal 9a is set in the input/output circuit 9. The input/output circuit 9 generates the fuel injection signal 9a of the width indicated by the signal set on the basis of the signal 8a, allowing the fuel injection apparatus 5 to inject fuel to the engine. After execution of ⑦, the program ends.

If the decision at 3 is YES, or if the signal at that time is the positional signal 2a, the program goes to ⑦, where only a process necessary for the fuel injection control is executed.

Finally, if the decision at 4 is YES, or if the signal is the reference signal 8a, the program goes through ⑥ and ⑦ to END.

Therefore, the flag in FIG. 3 is kept at zero until the first pulse of the reference cylinder process signal 7a appears after the engine starts to rotate. When the first pulse of the reference cylinder process signal 7a is detected, the flag is raised to be at "1" and then is not reset until the engine stops.

The operation of this embodiment will be described.

Under the condition that the start of engine is completed and the signals 1a, 2a and 3a are properly generated, the reference signal 8a appears at a certain timing, and since the flag is at "1", the process going through ① and ④ to ⑥ and ⑦ is executed step by step each time the reference signal 8a is detected. At this time, the signals 8a and 9a are produced on the basis of the reference signal 8a as shown in FIG. 2.

On the other hand, it is assumed that the engine is started by turning on the starter switch. At this time, since neither signal 1a nor 2a is generated, the flag is not yet raised.

It is assumed that the first pulse of only the positional signal 2a is detected. Then, when the program of FIG. 3 starts at the interruption timing, the program goes through ①, ② and ③ to ⑦ where only the process is executed to control the engine to inject fuel. Thereafter, when the first pulse of the reference cylinder signal 1a is detected, the reference cylinder process signal 7a is generated to allow the processes at ⑥ and ⑦ to be executed at the same time so that both the ignition control and fuel injection control are started.

When the first detected pulses after the start of the engine are the reference cylinder signal 1a and the positional signal 2a, the program of FIG. 3 goes through ② to ⑤, ⑥ and then ⑦. Thus, the engine is immediately controlled to ignite and inject fuel, and as a result, the decision at ① becomes always YES, i.e., the stationary condition is brought about.

Thus, it is assumed that as shown in FIG. 4, the crank shaft of the engine stops at an angular position x which is after the angular position where a pulse a of the reference cylinder signal 1a is generated, and which is much far from the angular position where the next pulse b is generated. At the next start, before the pulse b of the reference cylinder signal 1a is produced, the fuel injection signal 9a is produced immediately after the first pulse c of the positional signal 2a is detected, so that fuel is supplied to the engine. Therefore, when the first pulse b of the reference cylinder signal 1a is then generated, complete explosion accurately follows the start of ignition control, thus the starting characteristic of engine being improved.

On the contrary, in the prior art, when the engine starts at the angular position x of crank shaft shown in FIG. 4, the ignition control and the fuel injection control are not started until the first pulse b of the reference cylinder signal 1a occurs. That is, fuel is not supplied to the engine until the pulse b is generated. Thus, even if the ignition control is made, the engine will probably not shift to complete explosion at this time, and hence its starting characteristic is not good.

In other words, since the fuel fed from the fuel injection system is attached to the inlet pipe, it reaches the combustion chamber with a delay. Therefore, the starting characteristic of engine can be improved by increasing the fuel supply speed.

According to the embodiment shown in FIGS. 3 and 4, only the fuel ignition control is performed when the first pulse c of the positional signal 2a is detected, and then the ignition control is made when the first pulse b of the reference cylinder signal 1a is produced. The reason for this is as follows.

In the engine with odd-numbered cylinders, for example, 5 cylinders, the reference signal 8a for each cylinder is sure to include pulses coincident with all the pulses of the reference cylinder signal 1a but only with every other pulses of the positional signal 2a as shown in FIG. 2. The pulses of the positional signal 2a not coincident with the reference signal 8a are each deviated from the position of the reference signal by ½ the distance between the pulses of the reference signal 8a, or 72 degrees of crank angle for 5-cylinder engine as shown in FIG. 2.

Thus, in the embodiment of FIG. 4, if the ignition control is started immediately after the first pulse c of the positional signal 2a is generated, the ignition control will be delayed by 72 degrees from the normal ignition time until the first pulse b of the reference cylinder signal 1a is generated, and thus the engine will be rotated in the reverse direction, which fact leads to no improvement on the starting characteristic.

Therefore, in the engine with even-numbered cylinders, for example, 4 cylinders, and with a mechanical distributor, even if the ignition control is made immediately, particularly no trouble is caused. However, in the ignition system using an electronic high-voltage distributor as disclosed in the Japanese Patent Application No. 151670/1979, a cylinder to be ignited can not be specified and thus it is impossible to make ignition control until the pulse b is generated.

FIG. 5 is a flow chart of the operation of another embodiment of the invention in which a 5-cylinder engine is used. The construction of the hardware in this embodiment is the same as in FIG. 1.

The conditions for the interruption to the program of FIG. 5 are the same as in FIG. 3. That is, interruption occurs each time any one of the positional signal 2a, reference cylinder process signal 7a and reference signal 8a is produced as in FIG. 3.

The flow chart of FIG. 5 is different from that of FIG. 3 in that steps ⑧ and ⑨ are added. At these steps, the timings at which the reference signal 8a is produced from the PTM circuit 8 (FIG. 1) are switched in response to the signal first detected after the start of engine, and even if the first detected signal is either of the positional signal 2a and reference cylinder signal 7a, both the ignition control and fuel injection control are started immediately after the first detection of signal.

When the program goes to ⑧, setting is made of the PTM circuit 8 so that the firs pulse of the reference signal 8a is generated from the PTM circuit 8 at a position of crank angle which is 72 degrees after the pulse of the positional signal 2a and then the successive pulses of the reference signal 8a are each generated at every 144 degrees of crank angle.

When the program goes to ⑨, the setting is made of the PTM circuit so that the first pulse of the reference signal 8a is generated in synchronism with the pulse of the reference cylinder process signal 7a appearing at that time and then the successive pulses of the reference signal 8a are each generated at every 144 degrees of crank angle.

Figure 6:
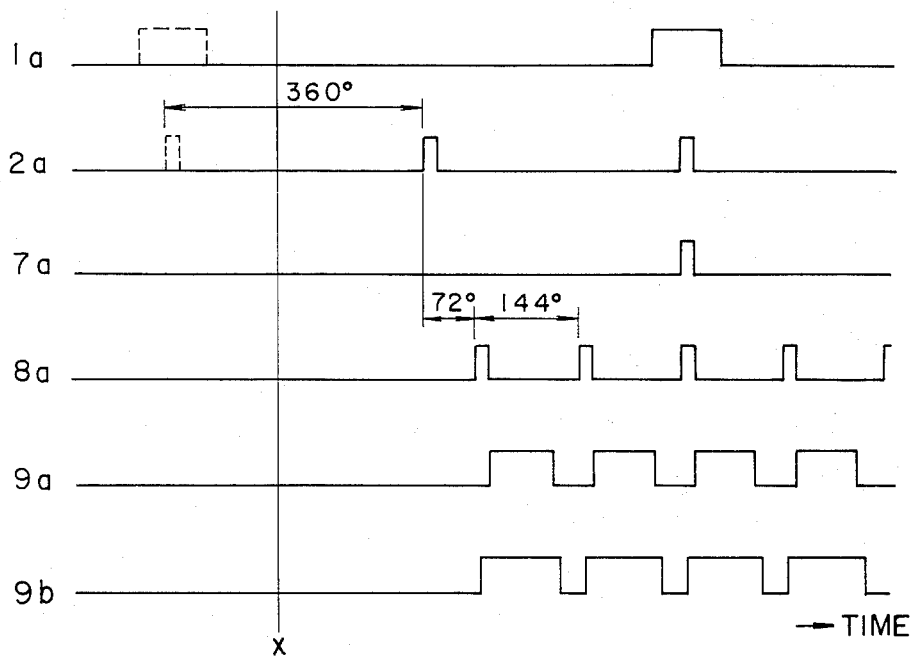
FIGS. 6 and 7 are timing charts of the operation thereof.
Figure 7:
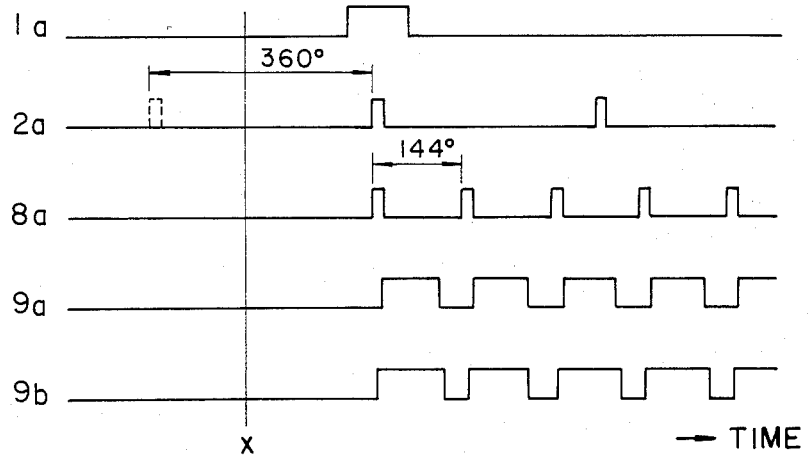

Therefore, according to the embodiment of FIG. 5, since control is started to generate the reference signal 8a when the first pulse of the positional signal 2a is produced after the start of the engine, the ignition control and the fuel injection control are started by the time the crank shaft makes one full revolution even if the crank shaft stops at any angular position before the start of engine, as shown in FIGS. 6 and 7. As a result, the starting characteristic of engine can be improved.

While a fuel injection type engine is used in the embodiment of FIG. 5, a carburetor-type engine may be used therein and in this case, the fuel injection control is not necessary, or only the ignition control is made.

In the embodiment of FIG. 5, a 5-cylinder engine is used and thus at step ⑧, the first pulse is generated at angular position of 72 degrees. It is desirable that this angle be selected to be just ½ the pulse distance of the reference signal 8a in the normal state, but in practical use, it can be selected to be about ½ the distance with satisfactory action and effect.

In the embodiment of FIG. 1, the counter 8 counts the pulse 3a to produce pulse 8a. Since the CPU 10 sets the counter 8 so that the number of pulses 3a corresponds to 144 degrees or 72 degrees, the counter 8 produces pulse 8a when the count reaches the specified number of pulses 3a. There is another system in which the pulse 3a is not used for the generation of pulse 8a. In this system, pulses with a predetermined spacing (clock pulse) are applied to the counter 8 instead of pulse 3a. On the other hand, the CPU 10 sets the counter to count the clock pulse to the number corresponding to 144 degrees or 72 degrees of crank angle. Thus, the counter 8 produces pulse 8a each time the count reaches the specified number of clock pulse, and the generator 3 for pulse 3a is not necessary, leading to low cost. The number of clock pulse corresponding to 144 or 72 degrees of crank angle is calculated by the CPU 10 as follows. It detects the engine speed by a well known method, calculates the time corresponding to 144 or 72 degrees of crank angle and calculates the number of clock pulses from the time.

While in the above embodiment a fuel injection signal for controlling the amount of fuel to be supplied and the timing of supplying fuel is produced on the basis of the reference pulse 8a and used in the system in which a common fuel injection valve is employed to distribute fuel to a plurality of cylinders, this invention may be used in the system in which a fuel injection valve is provided for each cylinder. In the latter system, fuel is injected on the basis of positional signal 2a. A fuel injection pulse 9a is generated on the basis of signal 2a and used to drive the fuel injection valves at the same time.

According to this invention, when the engine is controlled by the engine control apparatus using a microcomputer so that ignition control and fuel injection control are electronically made, it is possible to sufficiently decrease the delay with which the control of engine is made at the start, thus the starting characteristic of engine becoming good.

We claim:
1. A method of controlling engine comprising steps of:
   generating a reference cylinder signal each time the shaft of a 4-stroke cycle engine is rotated twice;
   generating a positional signal each time the shaft of said engine is rotated once;
   generating a reference signal on the basis of said reference cylinder signal and said positional signal;
   generating a fuel injection signal on the basis of said positional signal or said reference signal; and generating an ignition on the basis of said reference signal, wherein said method further includes steps of:

monitoring the generation of said reference cylinder signal and said positional signal;

generating said reference signal ½ its period after the first signal when the first signal after the start of the engine is only said positional signal; and generating said reference signal immediately after said positional signal when said reference signal and said positional signal are detected first.

2. A method of controlling engine comprising:

a first step for generating a reference cylinder signal each time the shaft of a four-stroke cycle engine is rotated twice;

a second step for generating a positional signal each time the shaft of said engine is rotated once;

a third step for generating a reference signal on the basis of said reference cylinder signal and said positional signal;

a fourth step for generating a fuel injection signal on the basis of said positional signal or said reference signal; and a fifth step for generating an ignition signal on the basis of said reference signal, wherein said method further includes steps of:

monitoring said reference cylinder signal and said positional signal in order to start said engine;

stopping said ignition signal from being generated and starting to generate said fuel injection signal when only said positional signal is first detected after the start of said engine; and starting to generate both said fuel injection signal and ignition signal when said reference cylinder signal and said positional signal are detected after the start of said engine.

3. A method of controlling engine according to claim 2, further comprising steps of causing interruption on the basis of said reference cylinder signal, causing interruption on the basis of said positional signal, and generating said ignition signal and fuel injection signal when interruption is caused on the basis of said reference cylinder signal.

4. A method of controlling engine according to claim 3, wherein said first signal after the start of engine is detected to be first by a flag, that is, when the flag is in one state, the first signal is detected to be first and then said flag is made in the other state in response to occurrence of interruption based on said reference cylinder signal.

* * * * *